(12) United States Patent
Tarao et al.

(10) Patent No.: US 11,401,369 B2
(45) Date of Patent: Aug. 2, 2022

(54) ROTAXANE, CROSSLINKED PRODUCT OF ROTAXANE, AND METHODS FOR PRODUCING THE SAME

(71) Applicants: Sumitomo Rubber Industries, Ltd., Kobe (JP); Tokyo Institute of Technology, Tokyo (JP)

(72) Inventors: Toshiyuki Tarao, Kobe (JP); Mami Tanaka, Kobe (JP); Toshikazu Takata, Tokyo (JP); Yosuke Akae, Tokyo (JP)

(73) Assignees: SUMITOMO RUBBER INDUSTRIES, LTD., Kobe (JP); TOKYO INSTITUTE OF TECHNOLOGY, Tokyo (JP)

( * ) Notice: Subject to any disclaimer, the term of this patent is extended or adjusted under 35 U.S.C. 154(b) by 0 days.

(21) Appl. No.: 17/133,004

(22) Filed: Dec. 23, 2020

(65) Prior Publication Data

US 2021/0198415 A1 Jul. 1, 2021

(30) Foreign Application Priority Data

Dec. 26, 2019 (JP) .............................. JP2019-236370
Dec. 26, 2019 (JP) .............................. JP2019-236371

(51) Int. Cl.

| | | |
|---|---|---|
| *C08G 18/64* | (2006.01) | |
| *C08G 18/76* | (2006.01) | |
| *C08B 37/16* | (2006.01) | |
| *C08G 18/48* | (2006.01) | |
| *C08G 83/00* | (2006.01) | |
| *C08G 18/32* | (2006.01) | |
| *C08L 5/16* | (2006.01) | |
| *C08G 18/10* | (2006.01) | |

(52) U.S. Cl.
CPC ...... *C08G 18/6423* (2013.01); *C08B 37/0015* (2013.01); *C08G 18/10* (2013.01); *C08G 18/3228* (2013.01); *C08G 18/3243* (2013.01); *C08G 18/4825* (2013.01); *C08G 18/7621* (2013.01); *C08G 18/7692* (2013.01); *C08G 83/007* (2013.01); *C08L 5/16* (2013.01)

(58) Field of Classification Search
CPC ............ C08G 18/6423; C08G 18/7692; C08G 18/3243; C08G 18/4825; C08G 18/7621; C08G 18/3228; C08G 18/10; C08G 83/007; C08B 37/0015; C08L 5/16
See application file for complete search history.

(56) References Cited

U.S. PATENT DOCUMENTS

| | | | |
|---|---|---|---|
| 2003/0138398 A1 | 7/2003 | Okumura et al. | |
| 2008/0097039 A1* | 4/2008 | Ito ....................... | C08G 83/007 525/384 |
| 2009/0088546 A1 | 4/2009 | Ito et al. | |

FOREIGN PATENT DOCUMENTS

| | | |
|---|---|---|
| JP | 6-25307 A | 2/1994 |
| JP | 3475252 B2 | 12/2003 |
| JP | 2005-154675 A | 6/2005 |
| JP | 2011-241401 A | 12/2011 |

OTHER PUBLICATIONS

Yamaguchi et al.; Synthesis of polyurea rotaxanes using a cyclodextrin complex of α, ω-diamine; 2000; Polymer Bulletin 44; pp. 247-253. (Year: 2000).*

* cited by examiner

*Primary Examiner* — Rabon A Sergent
(74) *Attorney, Agent, or Firm* — Birch, Stewart, Kolasch & Birch, LLP

(57) ABSTRACT

An object of the present invention is to provide a novel rotaxane and a production method of the same. The present invention provides a rotaxane polyurea having a cyclic molecule and a polyurea chain piercing through the cyclic molecule.

17 Claims, 9 Drawing Sheets

ROTAXANE, CROSSLINKED PRODUCT OF ROTAXANE, AND METHODS FOR PRODUCING THE SAME

FIELD OF THE INVENTION

The present invention relates to a novel rotaxane, a crosslinked product of a rotaxane, and methods for producing the same.

DESCRIPTION OF THE RELATED ART

Various research and development have been made for a rotaxane and a crosslinked product of a rotaxane.

For example, JP H06-25307 A discloses an α-cyclodextrin clathrate compound having an end-capped guest polymer, wherein a polyethylene glycol molecule pierces through an α-cyclodextrin molecule constituting a clathrate lattice, in a skewering manner, and both terminals of the polyethylene glycol molecule are chemically modified with a sufficiently bulky blocking group such that the α-cyclodextrin molecule is unable to disassociate from the polyethylene glycol molecule.

JP 2005-154675 A discloses a polyrotaxane comprising a carboxylated polyethylene glycol included in the opening of cyclodextrin molecules in a skewered manner and having a blocking group blocking dissociation of the cyclodextrin molecules at both terminals of the carboxylated polyethylene glycol, wherein the both terminals have a structure obtained by a reaction between a carboxyl group and a blocking group having a group reactive with the carboxyl group.

For example, JP No. 3475252 B discloses a compound comprising a crosslinked polyrotaxane, wherein the crosslinked polyrotaxane has a first polyrotaxane and a second polyrotaxane, the first polyrotaxane comprises a first linear molecule included in an opening of a first cyclic molecule in a skewered manner and having a first blocking group disposed at both terminals of the first linear molecule such that the first cyclic molecule is unable to dissociate, the second polyrotaxane comprises a second linear molecule included in an opening of a second cyclic molecule in a skewered manner and having a second blocking group disposed at both terminals of the second linear molecule such that the second cyclic molecule is unable to dissociate, the cycle of the first and second cyclic molecules is a substantial cycle, at least one of the first cyclic molecules and at least one of the second cyclic molecules are linked via a chemical bond, the first linear molecule and the second linear molecule have a molecular weight of 10,000 or more, and the compound is a viscoelastic material.

JP 2011-241401 A discloses a material comprising a first polyrotaxane and a second polyrotaxane, wherein the first polyrotaxane has a first blocking group disposed at both terminals of a first pseudo-polyrotaxane comprising a first linear molecule included in an opening of a first cyclic molecule in a skewered manner such that the first cyclic molecule does not disassociate, the second polyrotaxane has a second blocking group disposed at both terminals of a second pseudo-polyrotaxane comprising a second linear molecule included in an opening of a second cyclic molecule in a skewered manner such that the second cyclic molecule does not disassociate, the first and second polyrotaxanes are crosslinked via the first and second cyclic molecules, and the material is free of solvent and has at least one property selected from the group consisting of: X) a compression permanent strain is 10% or less; Y) a tensile stress relaxation is 15% or less; and Z) a hysteresis loss is 25% or less.

SUMMARY OF THE INVENTION

The conventional polyrotaxane has polyethylene glycol (PEG) as the axle molecule. The present invention has been made in view of the above circumstances, and an object of the present invention is to provide a novel rotaxane, a crosslinked product of a rotaxane, and methods for producing the same.

The rotaxane polyurea according to the present invention has at least one cyclic molecule and a polyurea chain piercing through the cyclic molecule. The present invention is characterized in that the axle molecule piercing through the cyclic molecule is the polyurea chain.

The crosslinked product of the rotaxane polyurea according to the present invention is a crosslinked product of a rotaxane polyurea having at least one cyclodextrin and a polyurea chain piercing through the cyclodextrin, wherein the cyclodextrins included in the rotaxane polyurea are crosslinked with a crosslinking agent. The present invention is characterized in that the axle molecule piercing through the cyclodextrin is the polyurea chain and the cyclodextrins are crosslinked.

In the method for producing the rotaxane polyurea according to the present invention, the polyurea chain piercing through the cyclic molecule is formed by carrying out a reaction of a rotaxane diamine that has the cyclic molecule and a diamine piercing through the cyclic molecule, a diisocyanate capable of piercing through the cyclic molecule, and a blocking compound that has two functional groups reactive with the rotaxane diamine or diisocyanate and blocks the cyclic molecule by steric hindrance.

The method for producing the crosslinked product of the rotaxane polyurea according to the present invention comprises a step of producing a rotaxane polyurea that has at least one cyclodextrin and a polyurea chain piercing through the cyclodextrin by a reaction between a rotaxane diamine that has the cyclodextrin and a diamine piercing through the cyclodextrin and a diisocyanate capable of piercing through the cyclodextrin; and a step of crosslinking the cyclodextrin included in the rotaxane polyurea with a crosslinking agent.

The present invention provides a novel rotaxane and a method for producing the same.

The present invention provides a novel crosslinked product of a rotaxane and a method for producing the same.

DESCRIPTION OF THE PREFERRED EMBODIMENT

Figure 1:
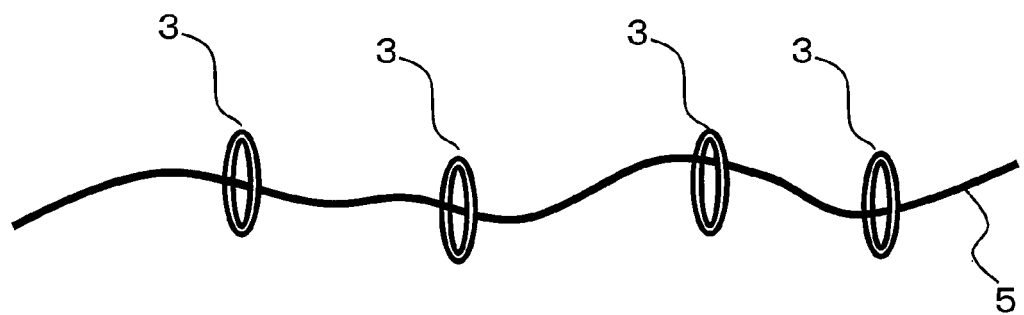
FIG. 1 is a schematic figure schematically illustrating one embodiment of a molecular structure of a rotaxane polyurea according to the present invention.

The rotaxane polyurea according to the present invention has at least one cyclic molecule and a polyurea chain piercing through the cyclic molecule. The rotaxane polyurea according to the present invention has a rotaxane structure where the polyurea chain serves as the axle molecule (axis molecule) piercing through the cavity of the cyclic molecule.

The crosslinked product of the rotaxane polyurea according to the present invention is a crosslinked product of a rotaxane polyurea having at least one cyclodextrin and a polyurea chain piercing through the cyclodextrin, wherein the cyclodextrins of the rotaxane polyurea are crosslinked with a crosslinking agent. The crosslinked product of the rotaxane polyurea according to the present invention is characterized in that the crosslinked product has a rotaxane structure where the polyurea chain serves as the axle molecule piercing through the cavity of the cyclodextrin, and the cyclodextrins are crosslinked.

In the present invention, the "rotaxane" means a molecule having a structure having at least one cyclic molecule and an axle molecule piercing through the cavity of the cyclic molecule. The axle molecule may or may not have a blocking structure preventing elimination of the cyclic molecule from the axle molecule. A "rotaxane" having 2 or more cyclic molecules through which the axle molecule pierces is sometimes referred to as a "polyrotaxane". The "polyrotaxane" having 2 or more cyclic molecules through which the axle molecule pierces is included in the "rotaxane" having at least one cyclic molecule through which the axle molecule pierces. In addition, when the "rotaxane" is referred to as the "rotaxane polyurea" or "rotaxane diamine", the "polyurea" or "diamine" means the axle molecule piercing through the cyclic molecule.

The number of the cyclic molecule included in one molecule of the rotaxane polyurea according to the present invention is not particularly limited, as long as the number is at least one. The number of the cyclic molecule included in one molecule of the rotaxane polyurea is preferably 3 or more, more preferably 4 or more, and even more preferably 5 or more, and is preferably 100 or less.

FIG. 1 is a schematic figure schematically illustrating the rotaxane polyurea according to the present invention. The rotaxane polyurea 1 has cyclic molecules 3 and a polyurea chain 5 piercing through the cyclic molecules 3. The polyurea chain 5 of the rotaxane polyurea 1 according to the embodiment shown in FIG. 1 has no blocking structure preventing elimination of the cyclic molecule 3 from the polyurea chain 5. Thus, the cyclic molecule 3 is allowed to move along the whole polyurea chain 5. If the polyurea chain 5 has a high molecular weight, the polyurea chains 5 tangle, and thus elimination of the cyclic molecule 3 from the polyurea chain 5 is suppressed.

It is preferable that the rotaxane polyurea according to the present invention has at least one cyclic molecule and a polyurea chain piercing through the cyclic molecule, and the polyurea chain has a blocking structure preventing elimination of the cyclic molecule from the polyurea chain in the main chain or at the terminal of the main chain. In the embodiment having the blocking structures at the terminal of the main chain, the blocking structures are preferably formed only at both terminals of the main chain. The blocking structures prevent elimination of the cyclic molecule from the polyurea chain.

Figure 2:
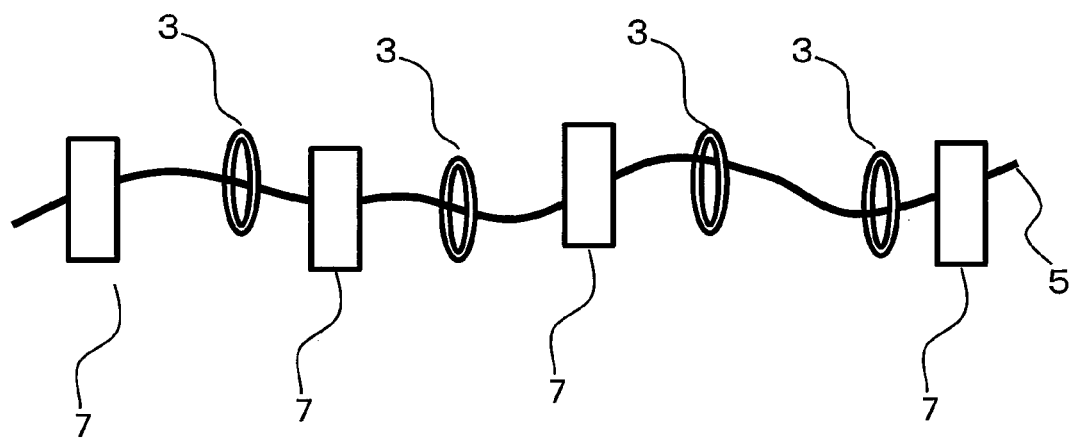
FIG. 2 is a schematic figure schematically illustrating one embodiment of a molecular structure of a rotaxane polyurea according to the present invention.

FIG. 2 is a schematic figure showing one embodiment of the blocking structure of the cyclic molecule included in the rotaxane polyurea according to the present invention. The rotaxane polyurea 1 has cyclic molecules 3 and a polyurea chain 5 piercing through the cyclic molecules 3, and blocking structures 7 preventing elimination of the cyclic molecules 3 from the polyurea chain 5 are formed in the main chain of the polyurea chain 5. The cyclic molecule 3 is allowed to move along the axle molecule between the adjacent blocking structures 7.

Figure 3:
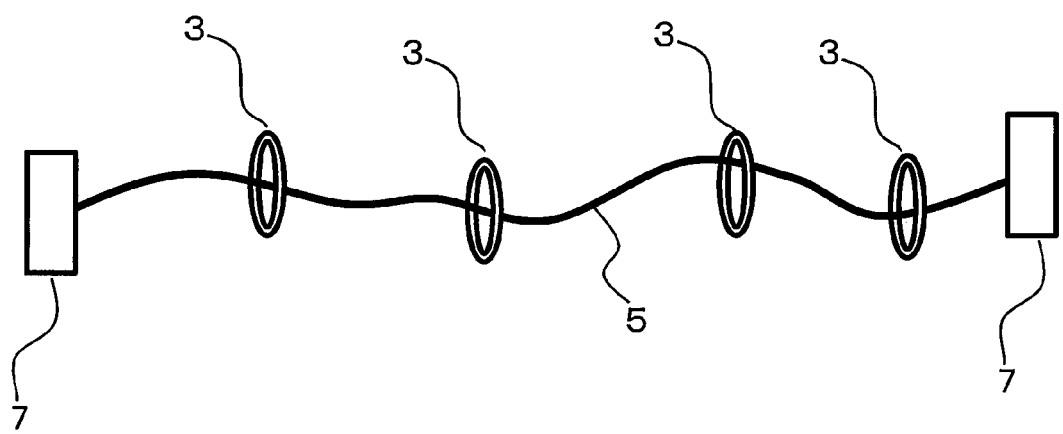
FIG. 3 is a schematic figure schematically illustrating one embodiment of a molecular structure of the rotaxane polyurea according to the present invention.

FIG. 3 is a schematic figure showing another embodiment of the blocking structure of the cyclic molecule included in the rotaxane polyurea according to the present invention. The rotaxane polyurea 1 has cyclic molecules 3 and a polyurea chain 5 piercing through the cyclic molecules 3, and blocking structures 7 preventing elimination of the cyclic molecules 3 from the polyurea chain 5 are formed only at both terminals of the main chain of the polyurea chain 5. The cyclic molecules 3 are allowed to move along the whole polyurea chain 5 which is the axle molecule.

The rotaxane polyurea according to the present invention is preferably obtained by a reaction between a diisocyanate and a rotaxane diamine that has at least one cyclic molecule and a diamine piercing through the cyclic molecule.

The polyurea chain serving as the axle molecule of the rotaxane polyurea according to the present invention will be explained. The polyurea chain is not particularly limited, as long as it has a plurality of urea bonds in the molecular chain and is capable of piercing through the cyclic molecule. The polyurea chain preferably has the urea bonds formed in the molecular chain by a reaction between a diisocyanate and a rotaxane diamine that has at least one cyclic molecule and a diamine piercing through the cyclic molecule. The diamine included in the rotaxane diamine and the diisocyanate react to form the polyurea chain having a plurality of urea bonds. The formed polyurea chain maintains a state piercing through the cyclic molecule included in the rotaxane diamine, thus the rotaxane structure that has at least one cyclic molecule and the polyurea chain piercing through the cyclic molecule is formed.

The rotaxane diamine constituting the rotaxane polyurea according to the present invention will be explained.

1. Rotaxane Diamine

The rotaxane diamine has at least one cyclic molecule and a diamine piercing through the cyclic molecule. In other words, the rotaxane diamine has a rotaxane structure having a diamine that serves as the axle molecule piercing through the cavity of the cyclic molecule.

Figure 4:
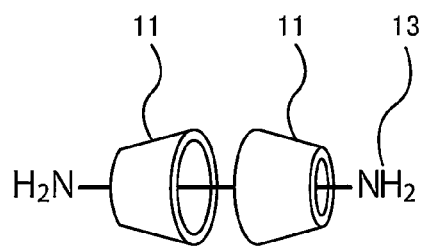
FIG. 4 is a schematic figure schematically illustrating one embodiment of a molecular structure of a rotaxane diamine used in the present invention.

FIG. 4 is a schematic figure schematically showing the rotaxane diamine used in the present invention. The rotaxane diamine 9 has two cyclic molecules 11 and a diamine 13 piercing through the cyclic molecules 11.

The number of the cyclic molecule included in one molecule of the rotaxane diamine is not particularly limited, as long as the number is at least one. The number of the cyclic molecule included in one molecule of the rotaxane diamine is preferably 2 or more, and is preferably 8 or less, more preferably 4 or less.

The rotaxane diamine may or may not have a blocking group preventing elimination of the cyclic molecule from the diamine serving as the axle molecule. In the present invention, a rotaxane diamine having no blocking group preventing elimination of the cyclic molecule from the diamine is preferably used. If there is no blocking group, the cyclic molecule included in the rotaxane diamine is not confined by the molecular chain derived from the diamine, and is allowed to move toward other molecular chain moiety constituting the polyurea chain. It is noted that in the present invention, a rotaxane diamine having no blocking group is sometimes referred to as a "pseudo-rotaxane diamine".

The cyclic molecule is an organic compound with a cyclic structure having a cavity at the center. Examples of the cyclic molecule include a crown ether, and a cyclodextrin. The cyclic molecule is preferably the cyclodextrin.

The cyclodextrin is a general term for an oligosaccharide having a cyclic structure. The cyclodextrin is, for example, a molecule having 6 to 8 D-glucopyranose residues being linked in a cyclic shape via an α-1,4-glucoside bond. Examples of the cyclodextrin include α-cyclodextrin (number of glucose units: 6), β-cyclodextrin (number of glucose units: 7), and γ-cyclodextrin (number of glucose units: 8), and α-cyclodextrin is preferable. The inner diameters of the cavity of the α-cyclodextrin (number of glucose units: 6), β-cyclodextrin (number of glucose units: 7), and γ-cyclodextrin (number of glucose units: 8) are about 0.57 nm, about 0.78 nm and about 0.95 nm, respectively.

The diamine is an organic compound having two amino groups. The diamine preferably has less steric hindrance such that the diamine is capable of piercing through the cyclic molecule. From this viewpoint, the diamine is preferably a linear diamine, more preferably a linear alkane diamine. It is noted that, to increase the reactivity of the amino group with the diisocyanate, the amino groups are preferably at both terminals of the molecular chain.

The number of carbon atoms of the diamine is not particularly limited, but from the balance between the number of the cyclic molecule to be pierced through and the ease of piercing through the cyclic molecule, the number of carbon atoms of the diamine is preferably 6 or more, more preferably 8 or more, even more preferably 10 or more, and most preferably 12 or more, and is preferably 30 or less, more preferably 25 or less, and even more preferably 20 or less.

Examples of the diamine include 1,6-hexane diamine, 1,7-heptane diamine, 1,8-octane diamine, 1,9-nonane diamine, 1,10-decane diamine, 1,11-undecane diamine, 1,12-dodecane diamine, 1,13-tridecane diamine, 1,14-tetradecane diamine, 1,15-pentadecane diamine, 1,16-hexadecane diamine, 1,17-heptadecane diamine, 1,18-octadecane diamine, 1,19-nonadecane diamine, and 1,20-icosane diamine. The diamine used in the present invention is preferably 1,12-dodecane diamine.

2. Diisocyanate

The diisocyanate is an organic compound having two isocyanate groups. The diisocyanate constitutes the polyurea chain serving as the axle molecule. In addition, since the diisocyanate constitutes the movable region of the cyclic molecule in the polyurea chain, a diisocyanate having less steric hindrance is preferable.

Examples of the diisocyanate include a diisocyanate monomer, and a diisocyanate macromonomer.

Examples of the diisocyanate monomer include an aromatic polyisocyanate such as 2,4-toluene diisocyanate, 2,6-toluene diisocyanate, a mixture of 2,4-toluene diisocyanate and 2,6-toluene diisocyanate (TDI), 4,4'-diphenylmethane diisocyanate (MDI), 1,5-naphthylene diisocyanate (NDI), 3,3'-bitolylene-4,4'-diisocyanate (TODD, xylylene diisocyanate (XDI), tetramethylxylylenediisocyanate (TMXDI), and para-phenylene diisocyanate (PPDI); and an alicyclic polyisocyanate or aliphatic polyisocyanate such as 4,4'-dicyclohexylmethane diisocyanate ($H_{12}$MDI), hydrogenated xylylenediisocyanate ($H_6$XDI), hexamethylene diisocyanate (HDI), isophorone diisocyanate (IPDI), and norbornene diisocyanate (NBDI).

The diisocyanate macromonomer is, for example, a product obtained by a reaction between the above diisocyanate monomer and a compound having two functional groups reactive with the isocyanate group under a condition that the isocyanate group is excessive. The product, i.e. the diisocyanate macromonomer is a macromonomer (prepolymer) having a higher molecular weight than the diisocyanate monomer and two isocyanate groups at the terminals thereof.

Examples of the compound having two functional groups reactive with the isocyanate group include a diol, a diamine, and an amino alcohol.

Examples of the diol include a low molecular weight diol having a molecular weight of less than 500, and a high molecular weight diol having a number average molecular weight of 500 or more. In the present invention, as the diol component constituting the diisocyanate macromonomer, a diol having a number average molecular weight in a range of from 500 to 10000 is preferably used, a diol having a number average molecular weight in a range of from 1000 to 5000 is more preferably used.

Examples of the low molecular weight diol include a diol such as ethylene glycol, diethylene glycol, triethylene glycol, 1,4-butanediol, and 1,6-hexanediol.

Examples of the high molecular weight diol include a polyether diol, a polyester diol, a polycaprolactone diol, and a polycarbonate diol.

Examples of the polyether diol include polyoxyethylene glycol (PEG), polyoxypropylene glycol (PPG), polyoxyethylene-polyoxypropylene glycol, and polyoxytetramethylene glycol (PTMG). Examples of the polyester polyol include polyethylene adipate (PEA), polybutylene adipate (PBA), and polyhexamethylene adipate (PHMA). Examples of the polycaprolactone polyol include poly-ε-caprolactone (PCL). Examples of the polycarbonate polyol include polyhexamethylene carbonate.

The number average molecular weight of the diisocyanate macromonomer is preferably 500 or more, more preferably 800 or more, and even more preferably 1000 or more, and is preferably 10000 or less, more preferably 8000 or less, and even more preferably 5000 or less.

In a preferable embodiment according to the present invention, the diisocyanate macromonomer is, for example, an isocyanate group terminated-prepolymer obtained by a reaction between the diisocyanate monomer and the polyether diol under a condition of NCO/OH=2/1 to 3/2 (molar ratio).

In a more preferable embodiment according to the present invention, the diisocyanate macromonomer is a compound represented by the following formula (1) obtained by a reaction between 2,4-toluene diisocyanate and polyoxypropylene glycol (PPG).

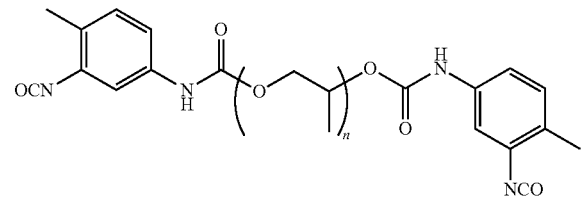

(1)

[In the formula (1), n represents number of repeating unit and is a number in a range of from 7 to 180.]

3. Other Component which can be Used to Constitute Polyurea Chain

The rotaxane polyurea according to the present invention may further have a diamine and/or a diol, or the like as the component constituting the polyurea chain which is the axle molecule, in addition to the above described rotaxane diamine and diisocyanate.

As the diamine, those listed as the diamine which is the axle component of the rotaxane diamine can be used. In addition, as the diol, those listed as the diol component constituting the diisocyanate macromonomer can be used.

In the case that the rotaxane polyurea according to the present invention includes the diol component as the component constituting the polyurea chain, the polyurea chain serving as the axle molecule piercing through the cyclic molecule further has a urethane bond in addition to the urea bond. Thus, the polyurea chain becomes a polyurea-urethane chain. Therefore, the rotaxane polyurea according to the present invention includes a rotaxane polyurea-urethane.

4. Blocking Compound

It is preferable that the rotaxane polyurea according to the present invention has at least one cyclic molecule and a polyurea chain piercing through the cyclic molecule, and the polyurea chain has a blocking structure preventing elimination of the cyclic molecule from the polyurea chain in the main chain or at the terminal of the main chain.

The size of the molecule forming the blocking structure is suitably chosen according to the inner diameter of the cyclic molecule. For example, a benzene ring has a circumscribed circle diameter of about 0.278 nm and a C—H bond length of 0.110 nm. For example, a methane molecule has a C—H bond distance of 0.110 nm. An ethane molecule has a C—C bond distance of about 0.153 nm and a C—H bond distance of 0.110 nm.

The blocking structure in the polyurea main chain is preferably formed from a blocking compound that has two functional groups reactive with the rotaxane diamine or diisocyanate and blocks the cyclic molecule by steric hindrance (hereinafter sometimes referred to as "bifunctional group blocking compound".)

The bifunctional group blocking compound is not particularly limited, as long as it has two functional groups reactive with the amino group or isocyanate group and blocks the cyclic molecule by steric hindrance. Examples of the bifunctional group blocking compound include a diamine, a diisocyanate, and a diol.

Specific example of the bifunctional group blocking compound include bis(4-isocyanate-3,5-diethylphenyl)methane, bis(4-amino-3,5-diethylphenyl)methane, and bis(4-hydroxy-3,5-diethylphenyl)methane.

In the case that the blocking structure is in the main chain, the proportion of the bifunctional group blocking compound constituting the polyurea chain is preferably 1.0 mole % or more, more preferably 1.5 mole % or more, and even more preferably 2.0 mole % or more, and is preferably 10.0 mole % or less, more preferably 8.0 mole % or less, and even more preferably 6.0 mole % or less. If the proportion of the bifunctional group blocking compound is 1.0 mole % or more, the blocking structure more effectively prevents elimination of the cyclic molecule from the polyurea chain. In addition, if the proportion of the bifunctional group blocking compound is 10.0 mole % or less, the movable region of the cyclic molecule in the polyurea chain is greater. As a result, the obtained rotaxane polyurea has better physical properties. It is noted that the proportion of the bifunctional group blocking compound is calculated by the following formula.

Proportion of bifunctional group blocking compound=100×[moles of bifunctional group blocking compound/(moles of bifunctional group blocking compound+moles of diisocyanate+moles of rotaxane diamine)

The blocking structure at the terminal of the polyurea main chain is preferably formed from a blocking compound that has one functional group reactive with the rotaxane diamine or diisocyanate and blocks the cyclic molecule by steric hindrance (hereinafter sometimes referred to as "monofunctional group blocking compound".)

The monofunctional group blocking compound is not particularly limited, as long as it has one functional group reactive with the amino group or isocyanate group and blocks the cyclic molecule by steric hindrance. Examples of the monofunctional group blocking compound include a monoamine, a monoisocyanate, and a monoalcohol.

Specific examples of the monofunctional group blocking compound include 3,5-dimethylphenyl isocyanate, 3,5-dimethylbenzyl amine, and 3,5-dimethylbenzyl alcohol.

The rotaxane polyurea according to the present invention may be either a block type or a random type. The block type or random type can be suitably prepared depending upon the production method.

The number average molecular weight (Mn) of the whole molecule of the rotaxane polyurea according to the present invention is preferably 15,000 or more, more preferably 20,000 or more, and even more preferably 25,000 or more. The upper limit thereof is preferably, but not particularly limited to 500,000.

The number average molecular weight (Mn) of the polyurea chain serving as the axle molecule of the rotaxane polyurea according to the present invention is preferably 15,000 or more, more preferably 20,000 or more, and even more preferably 25,000 or more. The upper limit thereof is not particularly limited and is preferably 500,000, more preferably 450,000, and even more preferably 400,000.

The molecular weight distribution (PDI) (Mw/Mn) of the whole molecule of the rotaxane polyurea according to the present invention is preferably 1.5 or more, more preferably 1.7 or more, and is preferably 4.0 or less, more preferably 3.5 or less, and even more preferably 3.0 or less.

The number average molecular weight and molecular weight distribution are measured by the method described later.

The Young's modulus of the rotaxane polyurea according to the present invention is preferably 5 MPa or more, more preferably 6 MPa or more, and even more preferably 7 MPa or more.

The elongation at break of the rotaxane polyurea according to the present invention is preferably 50% or more, more preferably 100% or more, even more preferably 300% or more, and most preferably 500% or more.

The stress at break of the rotaxane polyurea according to the present invention is preferably 1.5 MPa or more, more preferably 2.0 MPa or more, and even more preferably 3.0 MPa or more.

The Young's modulus, strain at break and stress at break are measured by the method described later.

In the rotaxane polyurea according to the present invention, the proportion (coverage ratio $\theta 1$) of the cyclic molecule including the diamine component that serves as the axle molecule of the rotaxane diamine and constitutes the polyurea chain is preferably 10% or more, more preferably 15% or more, and is preferably 80% or less, more preferably 60% or less. If the coverage ratio $\theta 1$ falls within the above range, sufficient elongation and strength can be obtained.

In the rotaxane polyurea according to the present invention, the proportion (coverage ratio $\theta 2$) of the cyclic molecule including the whole polyurea chain is preferably 0.5% or more, more preferably 1.0% or more, and is preferably 15% or less, more preferably 10% or less. If the coverage ratio $\theta 2$ falls within the above range, sufficient elongation and strength can be obtained.

It is noted that the coverage ratios $\theta 1$ and $\theta 2$ are calculated by measuring $^1$H-NMR of the rotaxane polyurea, as described later.

The crosslinked product of the rotaxane polyurea according to the present invention is a crosslinked product of a rotaxane polyurea having at least one cyclodextrin and a polyurea chain piercing through the cyclodextrin, wherein the cyclodextrins of the rotaxane polyurea are crosslinked with a crosslinking agent. The crosslinked product of the rotaxane polyurea according to the present invention is characterized in that the crosslinked product has a rotaxane structure where the polyurea chain serves as the axle molecule piercing through the cavity of the cyclodextrin, and that the cyclodextrins are crosslinked.

The number of the cyclodextrin in one molecule of the rotaxane polyurea used in this embodiment is not particularly limited, as long as the number is at least one. The number of the cyclic molecule in one molecule of the rotaxane polyurea is preferably 3 or more, more preferably 4 or more, and even more preferably 5 or more, and is preferably 100 or less.

Figure 5:
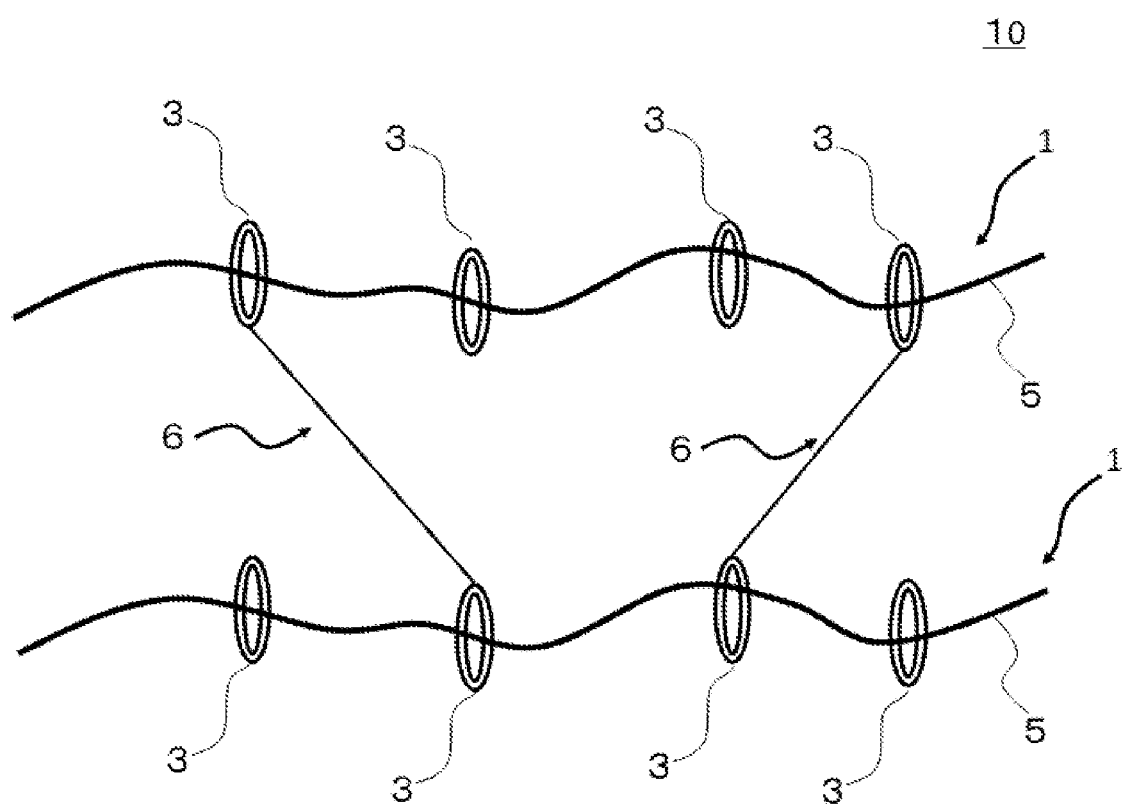
FIG. 5 is a schematic figure schematically illustrating one embodiment of a molecular structure of a crosslinked product of a rotaxane polyurea according to the present invention.

FIG. 5 is a schematic figure schematically showing one example of a molecular structure of the crosslinked product 10 of the rotaxane polyurea according to the present invention. The rotaxane polyurea 1 has cyclodextrins 3 and a polyurea chain 5 piercing through the cyclodextrins 3. The cyclodextrins 3 in the rotaxane polyurea 1 are crosslinked with a crosslinking agent 6. Although the polyurea chain 5 of the rotaxane polyurea 1 according to the embodiment shown in FIG. 5 has no blocking structure preventing elimination of the cyclodextrin 3 from the polyurea chain 5, the cyclodextrins 3 are confined by the crosslinked structure, thus the elimination of the cyclodextrins 3 from the polyurea chain 5 is suppressed. It is noted that although FIG. 5 shows an intermolecular crosslinking structure between two molecules of the rotaxane polyurea, the crosslinked product of the rotaxane polyurea according to the present invention also includes an intramolecular crosslinking structure.

It is preferable that the rotaxane polyurea used in this embodiment has at least one cyclodextrin and a polyurea chain piercing through the cyclodextrin, and the polyurea chain has a blocking structure preventing elimination of the cyclodextrin from the polyurea chain in the main chain or at the terminal of the main chain. In the embodiment having the blocking structures at the terminal of the main chain, the blocking structures are preferably formed only at both terminals of the main chain. The blocking structures prevents elimination of the cyclodextrin from the polyurea chain.

Figure 6:
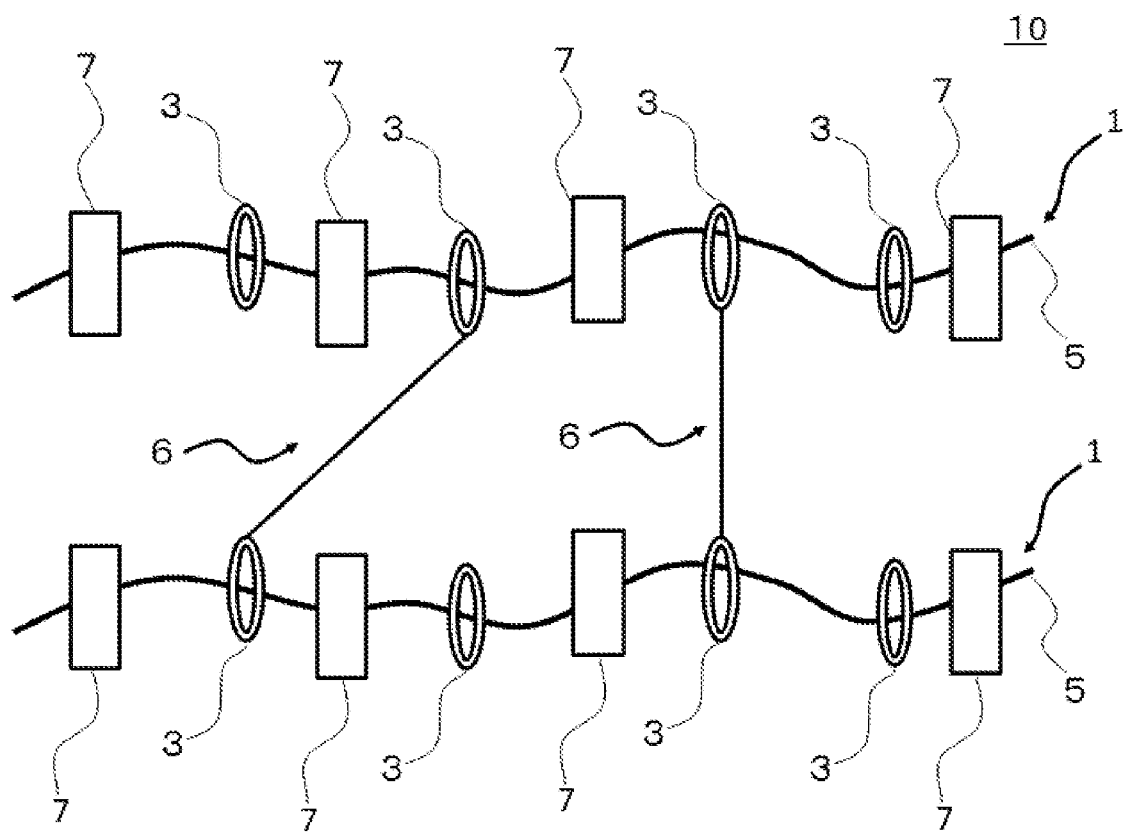
FIG. 6 is a schematic figure schematically illustrating one embodiment of a molecular structure of a crosslinked product of a rotaxane polyurea according to the present invention.

FIG. 6 is a schematic figure schematically showing a molecular structure of the crosslinked product 10 of the rotaxane polyurea according to the present invention. The rotaxane polyurea 1 has cyclodextrins 3 and a polyurea chain 5 piercing through the cyclodextrins 3. Blocking structures 7 are formed in the main chain of the polyurea chain 5 to prevent elimination of the cyclodextrin 3 from the polyurea chain 5. The cyclodextrin 3 is allowed to move along the axle molecule between the adjacent blocking structures 7. The cyclodextrins 3 in the rotaxane polyurea 1 are crosslinked with a crosslinking agent 6.

Figure 7:
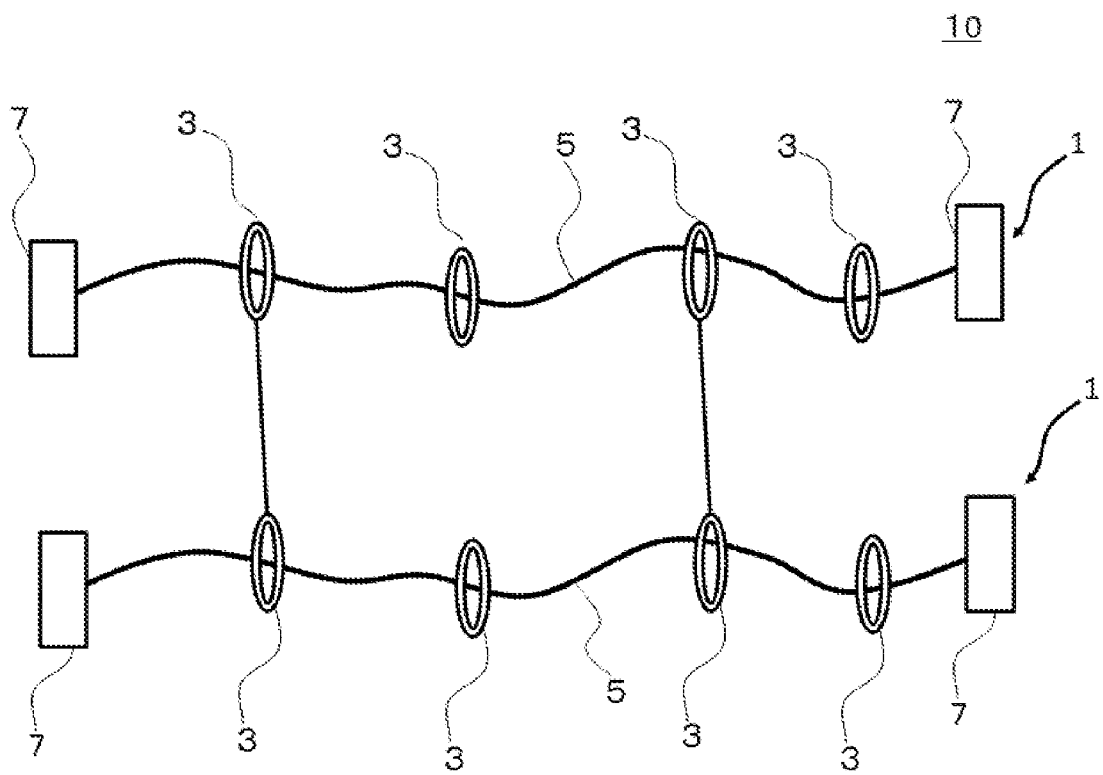
FIG. 7 is a schematic figure schematically illustrating one embodiment of a molecular structure of a crosslinked product of a rotaxane polyurea according to the present invention.

FIG. 7 is a schematic figure schematically showing one example of a molecular structure of the crosslinked product 10 of the rotaxane polyurea according to the present invention. The rotaxane polyurea 1 has cyclodextrins 3 and a polyurea chain 5 piercing through the cyclodextrins 3. Blocking structures 7 are formed only at the both terminals of the main chain of the polyurea chain 5 to prevent elimination of the cyclodextrin 3 from the polyurea chain 5. The cyclodextrins 3 are allowed to move along the whole polyurea chain 5 serving as the axle molecule. The cyclodextrins 3 in the rotaxane polyurea 1 are crosslinked with a crosslinking agent 6.

5. Crosslinking Agent

The crosslinking agent is not particularly limited, as long as it is a compound having two or more functional groups reactive with the hydroxy group included in the cyclodextrin which is the cyclic molecule of the rotaxane polyurea. Examples of the functional group include an epoxy group and an isocyanate group. Among them, the isocyanate group is preferable.

As the crosslinking agent, the polyisocyanate is preferable. The crosslinking agent reacts with the hydroxy group included in the cyclodextrin to crosslink the rotaxane polyurea. Examples of the polyisocyanate used as the crosslinking agent include an aromatic diisocyanate such as 2,4-toluene diisocyanate, 2,6-toluene diisocyanate, a mixture of 2,4-toluene diisocyanate and 2,6-toluene diisocyanate (TDI), 4,4'-diphenylmethane diisocyanate (MDI), 1,5-naphthylene diisocyanate (NDI), 3,3'-bitolylene-4,4'-diisocyanate (TODD, xylylene diisocyanate (XDI), tetramethylxylylenediisocyanate (TMXDI), and para-phenylene diisocyanate (PPDI); an alicyclic diisocyanate or aliphatic diisocyanate such as 4,4'-dicyclohexylmethane diisocyanate ($H_{12}$MDI), hydrogenated xylylenediisocyanate ($H_6$XDI), hexamethylene diisocyanate (HDI), isophorone diisocyanate (IPDI), and norbornene diisocyanate (NBDI); and a triisocyanate such as an allophanate-modified product, a biuret-modified product, an isocyanurate and an adduct of the above diisocyanate. The polyisocyanate may be used solely, or two or more of them may be used in combination.

It is noted that from the viewpoint of adjusting the distance between the crosslinked points, it is also a preferable embodiment that the diisocyanate macromonomer capable of constituting the polyurea chain of the rotaxane polyurea is used as the crosslinking agent.

As the epoxy-based crosslinking agent, a polyglycidyl compound is preferable. Examples of the epoxy-based crosslinking agent include bisphenol A type epoxy resin, phenol novolac type epoxy resin, cresol novolac type epoxy resin, polyalkylene ether diglycidyl ether, glycidyl phthalate, tetraglycidyl diaminodiphenyl methane, and triglycidyl isocyanurate.

The molar ratio (crosslinking agent/cyclodextrin×100) of the crosslinking agent to the cyclodextrin in the rotaxane polyurea is preferably 15 mole % or less, more preferably 10 mole % or less, and even more preferably 8 mole % or less. If the amount of the crosslinking agent is more than 15 mole %, the obtained crosslinked product of the rotaxane polyurea has a high crosslinking degree, and thus may have a fragile property. The lower limit of the molar ratio (crosslinking agent/cyclodextrin×100) of the crosslinking agent to the cyclodextrin in the rotaxane polyurea is not particularly limited, but the lower limit is preferably 1.0 mole %, more preferably 2.0 mole %, and even more preferably 3.0 mole %.

The Young's modulus of the crosslinked product of the rotaxane polyurea according to the present invention is preferably 7 MPa or more, more preferably 8 MPa or more, and even more preferably 9 MPa or more.

The elongation at break of the crosslinked product of the rotaxane polyurea according to the present invention is preferably 5% or more, more preferably 8% or more, even more preferably 10% or more, and most preferably 20% or more.

The stress at break of the crosslinked product of the rotaxane polyurea according to the present invention is preferably 0.5 MPa or more, more preferably 1.0 MPa or more, and even more preferably 1.5 MPa or more.

The Young's modulus, strain at break and stress at break are measured by the method described later.

Next, the method for producing the rotaxane polyurea according to the present invention will be explained.

The rotaxane polyurea according to the present invention can be obtained by a reaction between a diisocyanate and a rotaxane diamine that has at least one cyclic molecule and a diamine piercing through the cyclic molecule. The diamine in the rotaxane diamine reacts with the diisocyanate to form the polyurea chain having a plurality of urea bonds. The formed polyurea chain maintains a state piercing through the cyclic molecule in the rotaxane diamine, thus the rotaxane structure having at least one cyclic molecule and the polyurea chain piercing through the cyclic molecule is formed.

In a preferable embodiment, as the diisocyanate component, the above described diisocyanate macromonomer is used. If the diisocyanate macromonomer is used, the rotaxane polyurea easily has a high molecular weight.

In the production of the rotaxane polyurea according to the present invention, a diamine and/or a diol, or the like may be used as the component constituting the polyurea chain serving as the axle molecule, in addition to the above described rotaxane diamine and diisocyanate.

Examples of the reaction method include a one-shot method reacting all the materials at the same time; and a prepolymer method reacting a part of the materials to produce a prepolymer having a medium level molecular weight, followed by making this prepolymer have a high molecular weight by using a chain extender component.

In the production method according to the present invention, a blocking structure is preferably formed in the main chain or at the terminal of the main chain of the polyurea chain in the rotaxane polyurea to prevent elimination of the cyclic molecule from the polyurea chain In case of forming the blocking structure at the terminal of the main chain (preferably only at both terminals of the main chain) of the polyurea chain, the blocking structure is formed at the terminal of the main chain, for example, by a reaction between the rotaxane diamine and the diisocyanate to produce the polyurea chain, and a further reaction between the blocking compound having one functional group reactive with the amino group or isocyanate group and the amino group or isocyanate group existing at both terminals of the polyurea chain.

In case of forming the blocking structure in the main chain of the polyurea chain, the blocking structure is formed in the main chain by a reaction of the rotaxane diamine, the diisocyanate, and the blocking compound having two functional groups reactive with the rotaxane diamine or diisocyanate.

Examples of the blocking compound for use in the above production method include the blocking compounds described above. These blocking compounds may be used solely, or two or more of them may be used in combination.

It is noted that in the case that the diisocyanate macromonomer (diisocyanate macromonomer having a urethane bond in the molecule) obtained by the reaction between the above described diisocyanate monomer and the polyether diol is used as the diisocyanate in the production method, the product corresponds to the rotaxane polyurea-urethane according to the present invention. Thus, the method for producing the rotaxane polyurea-urethane according to the present invention is included in the method for producing the rotaxane polyurea.

In the production method according to the present invention, in the reaction between the diisocyanate and the rotaxane diamine, the molar ratio of the isocyanate group in the diisocyanate to the functional group (e.g. hydroxy group, amino group, imino group) reactive with the isocyanate group in the compound having the functional group preferably ranges from 0.8/1.0 to 1.2/1.0. If the molar ratio falls within the above range, the molecular weight is suitable.

In the production method according to the present invention, a solvent is preferably used. Specific examples of the solvent include N,N-dimethylformamide (DMF), N,N-dimethylacetamide (DMAc), and N-methyl-2-pyrrolidone (NMP). DMF in which the raw material has high solubility is preferable.

In the production method according to the present invention, a conventional catalyst for the synthesis of a polyurethane can be used. Examples of the catalyst include monoamines such as triethylamine and N,N-dimethylcyclohexyl amine; polyamines such as N,N,N',N'-tetramethylethylene diamine and N,N,N',N'',N''-pentamethyldiethylene triamine; cyclic diamines such as 1,8-diazabicyclo[5.4.0]-7-undecene (DBU) and triethylene diamine; and tin catalysts such as dibutyltin dilaurate and dibutyltin diacetate. These catalysts may be used solely, or two or more of them may be used in combination. Among them, the tin catalysts such as dibutyltin dilaurate and dibutyltin diacetate are preferable, and dibutyltin dilaurate is particularly preferable.

The temperature for the reaction between the diisocyanate and the rotaxane diamine is not particularly limited, but the reaction temperature is preferably less than 100° C., more preferably 50° C. or less, and even more preferably 30° C. or less. The reaction between the isocyanate group and the amino group is violent, thus the reaction is preferably conducted at a low temperature.

The time for the reaction between the diisocyanate and the rotaxane diamine is not particularly limited, but the reaction time is preferably 6 hours or more, more preferably 12 hours or more, and even more preferably 18 hours or more. In addition, from the viewpoint of the production efficiency, the reaction time is preferably 24 hours or less.

The product obtained by the above production method is preferably purified by a conventional purification method. For example, purification is conducted by pouring the obtained product (containing the solvent and the like) into water, and heating the obtained precipitate in vacuum to dry the same.

Figure 8:
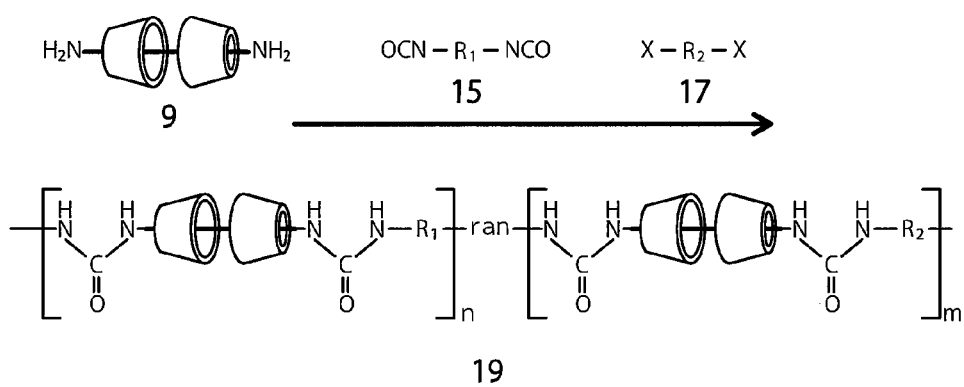
FIG. 8 is a schematic figure schematically illustrating one example of a reaction scheme producing a rotaxane polyurea according to the present invention.

FIG. 8 is a figure schematically showing one example of a reaction scheme producing the rotaxane polyurea according to the present invention. In FIG. 8, a rotaxane diamine 9, a diisocyanate macromonomer 15 and a blocking compound 17 having two functional groups X reactive with the rotaxane diamine or diisocyanate macromonomer are allowed to react to give a random rotaxane polyurea 19.

The method for producing the crosslinked product of the rotaxane polyurea according to the present invention comprises a step of reacting a rotaxane diamine that has a cyclodextrin and a diamine piercing through the cyclodextrin with a diisocyanate capable of piercing through the cyclodextrin to prepare a rotaxane polyurea having at least one cyclodextrin and a polyurea chain piercing through the cyclodextrin; and a step of crosslinking the cyclodextrins in the rotaxane polyurea with a crosslinking agent.

The method for producing the rotaxane polyurea are as described above.

The method for producing the crosslinked product of the rotaxane polyurea according to the present invention comprises a step of crosslinking the rotaxane polyurea obtained in the rotaxane polyurea production step with a crosslinking agent (In the present invention, sometimes simply referred to as "crosslinking step"). The method for crosslinking the rotaxane polyurea is not particularly limited, as long as the method comprises contacting the rotaxane polyurea with the crosslinking agent. The crosslinking of the rotaxane polyurea is conducted, for example, by mixing the crosslinking agent and a rotaxane polyurea composition containing the rotaxane polyurea, and undergoing a reaction between them.

The rotaxane polyurea used in the crosslinking step is the rotaxane polyurea obtained above. The rotaxane polyurea may be used solely, or two or more of them may be used in combination.

Examples of the crosslinking agent used in the crosslinking step include the crosslinking agents described above. These crosslinking agents may be used solely, or two or more of them may be used in combination.

In the production method according to this embodiment, a solvent is preferably used. Specific examples of the solvent include N,N-dimethylformamide (DMF), N,N-dimethylacetamide (DMAc), and N-methyl-2-pyrrolidone (NMP). DMF in which the raw material has high solubility is preferable.

In the production method according to this embodiment, a conventional catalyst for the synthesis of a polyurethane can be used. Examples of the catalyst include monoamines such as triethylamine and N,N-dimethylcyclohexyl amine; polyamines such as N,N,N',N'-tetramethylethylene diamine and N,N,N',N'',N''-pentamethyldiethylene triamine; cyclic diamines such as 1,8-diazabicyclo[5.4.0]-7-undecene (DBU) and triethylene diamine; and tin catalysts such as dibutyltin dilaurate and dibutyltin diacetate. These catalysts may be used solely, or two or more of them may be used in combination. Among them, the tin catalysts such as dibutyltin dilaurate and dibutyltin diacetate are preferable, and dibutyltin dilaurate is particularly preferable.

In the production method according to this embodiment, the catalyst is preferably used only in the crosslinking step. The crosslinking step is preferably conducted, for example, at a reaction temperature in a range of from −10° C. to 100° C. for 1 hour to 48 hours. The reaction between the rotaxane diamine and the diisocyanate is rapid, thus the catalyst may not be used.

The product obtained by the production method according to this embodiment is preferably purified by a conventional purification method. For example, purification is conducted by pouring the obtained product (containing the solvent and the like) into water, and heating the obtained precipitate in vacuum to dry the same.

EXAMPLES

Next, the present invention will be described in detail by way of examples. However, the present invention is not limited to the examples described below. Various changes and modifications without departing from the spirit of the present invention are included in the scope of the present invention.

Evaluation Method (1) Measurement of $^1$H-NMR Spectrum $^1$H-NMR spectrum was recorded with Bruker Biospin AVANCE DPX-300 and Bruker AVANCEIIIHD500 by using a deuterated solvent. The spectrum was calibrated by using a non-deuterated solvent and tetramethylsilane as an internal standard substance.

(2) Number Average Molecular Weight, Weight Average Molecular Weight and Molecular Weight Distribution (Dispersity)

The number average molecular weight and weight average molecular weight were measured by size exclusion chromatography (SEC) by using polystyrene as a standard substance, using DMF (LiBr, 5 mM) as an eluent, and using JASCO PU-2080 system provided with TOSOH TSKgel G2500H and G4000H column set as a column under conditions of 30° C. at a flow rate of 0.85 ml/min. The molecular weight distribution is calculated by weight average molecular weight/number average molecular weight.

(3) Tensile Test

The tensile test was conducted with SHIMADZU AG-IS provided with a 50 N load cell at a temperature of 25° C. at an elongation ratio of 167%/min. From the results of the tensile test, the tensile properties (Young's modulus, strain at break, stress at break, fracture energy) were calculated. The Young's modulus was calculated by using the strain between 0 and 10% and the stress corresponding to these strain. It is noted that sheets formed from the rotaxane polyurea and the crosslinked product of the rotaxane polyurea were punched into a dumbbell shape (60 mm) by using a punching blade, and the dumbbell-shaped sheets were used as the tensile test samples.

(4) Coverage Ratio θ1(%)

Figure 14:
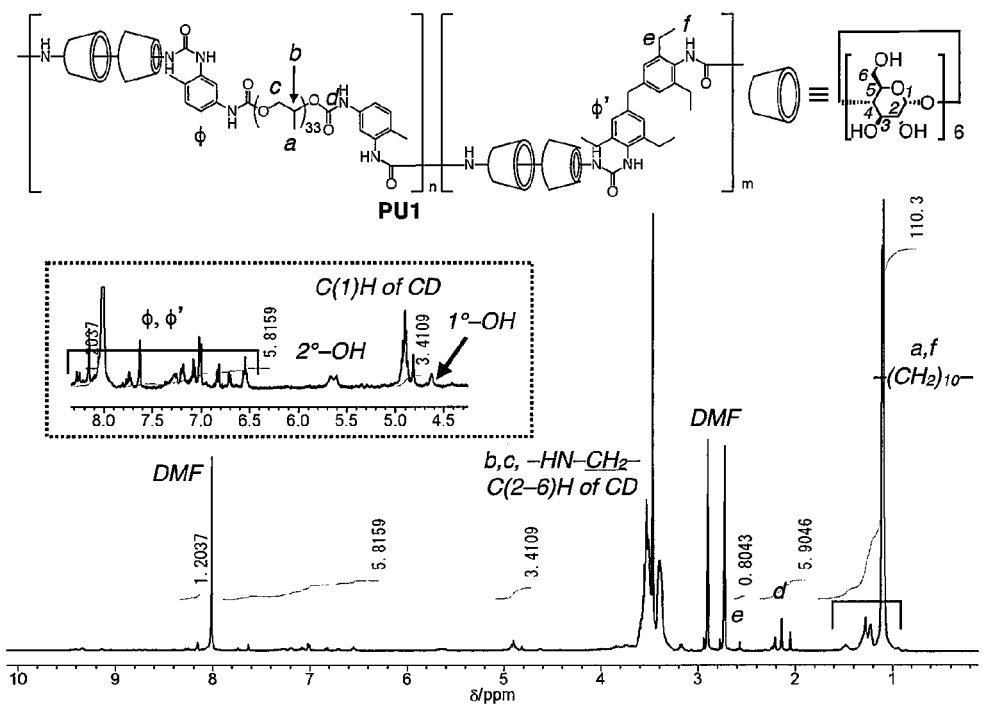
FIG. 14 is $^1$H-NMR spectrum of one example of a rotaxane polyurea according to the present invention.

The coverage ratio θ1 was calculated as follows based on the measurement result of $^1$H-NMR. FIG. 14 is $^1$H NMR data (400 MHz, 298K, DMF-d$_7$) of PU1, which were prepared as follows. The dodecane chain has an integral value of 20 for —(CH$_2$)$_{10}$—, the PPG chain has an integral value of 3×33×0.9=89.1 for the methyl group a, the bulky isocyanate has an integral value of 3×4×0.1=1.2 for the methyl group f, and the sum of them is 20+89.1+1.2=110.3. This integral value is adopted as a standard value. The cyclodextrin has an integral value of 3.4 for C(1)H. Here, in the case that the dodecane chain pierces through two cyclodextrins, the coverage ratio is defined as 100%. In the case that the dodecane chain pierces through two cyclodextrins, the cyclodextrin has an integral value of 12 for C (1)H.

Thus, the coverage ratio θ1 of the dodecane chain moiety is calculated by the following formula.

θ1=(3.4/12)×100=28% (PU1)

(5) Coverage Ratio θ2(%)

The cyclodextrin includes two PPG units. In other words, in the case that the coverage ratio θ2=100%, 16.5 of the cyclodextrin units include the diisocyanate macromer ("NCO-PPG"). If two cyclodextrin units of the dodecane chain are added to this, 18.5 of the cyclodextrin units exist. Herein, calculated as above, the number of the cyclodextrin units of the dodecane chain moiety of the PU1 is 0.57 (=3.4/12×2).

Thus, the coverage ratio θ2 of the polyurea chain is calculated by the following formula.

θ2=(0.57/18.5)×100=3.0% (PU1)

(6) Coverage Ratio θ1 of PU14(%)

Figure 15:
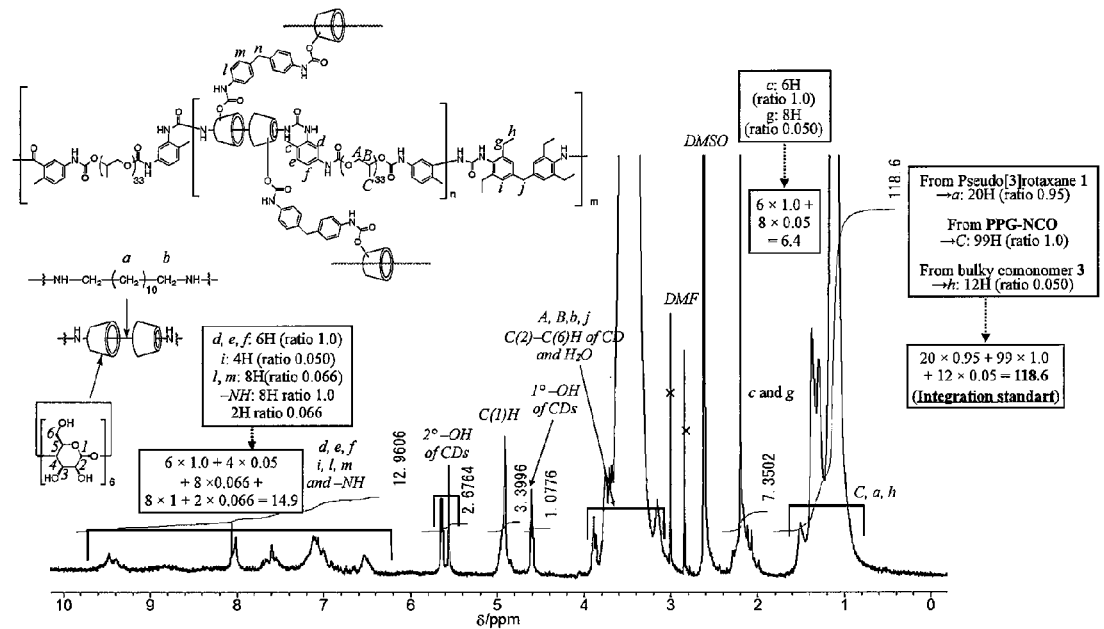
FIG. 15 is $^1$H-NMR spectrum of one example of a crosslinked product of a rotaxane polyurea according to the present invention

The coverage ratio θ1 of PU14 was calculated as follows based on the measurement result of $^1$H-NMR. FIG. 15 is $^1$H-NMR (400 MHz, 298K, DMSO-d$_6$) data of PU14, which were prepared as follows. The dodecane chain has an integral value of 20×0.95=19 for —(CH$_2$)$_{10}$—, the PPG chain has an integral value of 3×33=99 for the methyl group a, the bulky isocyanate has an integral value of 3×4× 0.05=0.6 for the methyl group f, and the sum of them is 19+99+0.6=118.6. This integral value is adopted as a standard value. The cyclodextrin has an integral value of 3.4 for C(1)H. Here, in the case that the dodecane chain pierces through two cyclodextrins, the coverage ratio is defined as 100%. In the case that the dodecane chain pierces through two cyclodextrins, the cyclodextrin has an integral value of 12×0.95=11.4 for C (1)H.

Thus, the coverage ratio θ1 of the dodecane chain moiety is calculated by the following formula.

θ1=(3.4/(12×0.95))×100=30% (PU14)

(7) Coverage Ratio θ2 of PU14(%)

The cyclodextrin includes two PPG units. In other words, in the case that the coverage ratio θ2=100%, 16.5 of the cyclodextrin units includes the diisocyanate macromer ("NCO-PPG"). If 2×0.95=1.9 cyclodextrin units of the dodecane chain are added to this, 18.4 of the cyclodextrin units exist. Herein, calculated as above, the number of the cyclodextrin unit of the dodecane chain moiety of the PU1 is 0.57 (=2×0.30×0.95).

Thus, the coverage ratio θ2 of the polyurea chain is calculated by the following formula.

θ2=(0.57/18.4)×100=3.1% (PU14)

Raw Materials for Producing Rotaxane Polyurea (1) Rotaxane Diamine

The rotaxane diamine was synthesized according to the synthetic method of pseudo-[3] rotaxane P1 described in Eur. J. Org. Chem. 2019, 3605-3613. Specifically, 1,12-diaminododecane (8.8 g, 44 mmol) was added to a solution of α-cyclodextrin (86 g, 89 mmol) in water (600 ml), and the mixture was refluxed for 1 hour and stood overnight at room temperature. The resulting mixture was filtrated to collect the precipitate, and the collected precipitate was washed with water and dried in vacuo to give a rotaxane diamine (95 g) as a white crystal.

It is noted that according to the confirmation method described in Eur. J. Org. Chem. 2019, 3605-3613, this rotaxane diamine was confirmed to have two cyclic molecules (α-cyclodextrin) and an amino group-terminated linear diamine (1,12-diaminododecane) piercing through the cyclic molecules, and have no blocking group, as shown in FIG. 4. Hereinafter, this rotaxane diamine is referred as to pseudo-[3] rotaxane diamine.

(2) Diisocyanate

As the diisocyanate macromonomer, a compound represented by the following formula (2) (hereinafter abbreviated as "NCO-PPG") (available from Merck Co., Ltd., Mn=2300) was used. It is noted that this compound is an isocyanate group-terminated urethane prepolymer (trimer) obtained by reacting 2,4-toluene diisocyanate with both terminals of polypropylene glycol having an oxypropylene unit with an average polymerization degree of 33.

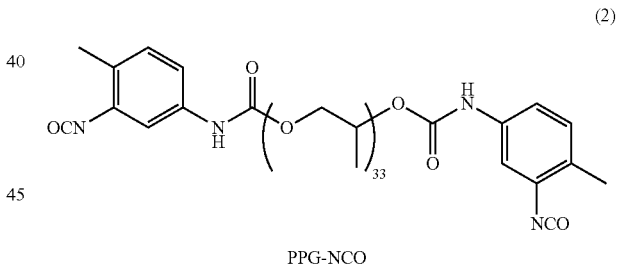

PPG-NCO

In addition, as the diisocyanate monomer, 4,4'-diphenylmethane diisocyanate (MDI) was used.

(3) Blocking Compound

Bis(4-isocyanate-3,5-diethylphenyl)methane was synthesized as follows. Triphosgene (9.6 g, 32 mmol) was dissolved in toluene (300 ml) to obtain a solution, and bis(4-amino-3,5-diethylphenyl)methane (4.5 g, 15 mmol) solution in toluene (60 ml) was added to the solution and refluxed for 12 hours. The mixture was cooled at room temperature, washed with saturated sodium hydrogen carbonate aqueous solution, and dried with anhydrous magnesium sulfate. The resulting mixture was filtrated, the obtained filtrate was evaporated, and the residue was dried in vacuo to give bis(4-isocyanate-3,5-diethylphenyl)methane (2.8 g, 7.8 mmol) as a white solid. The structure of bis(4-isocyanate-3,5-diethylphenyl)methane is represented by the following formula (3). It is noted that the product was directly used in the subsequent reaction without being purified.

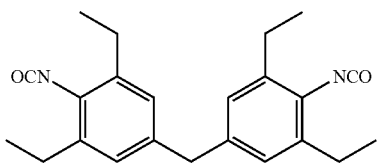

(3)

In addition, as bis(4-amino-3,5-diethylphenyl)methane, a commercially available product was used. The structure thereof is represented by the following formula (4).

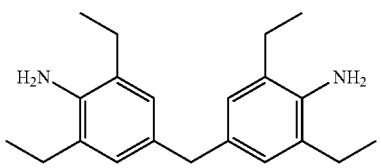

(4)

Production of Rotaxane Polyurea (1) Production of PU1 (One-Shot Method)

Figures 9, 10:
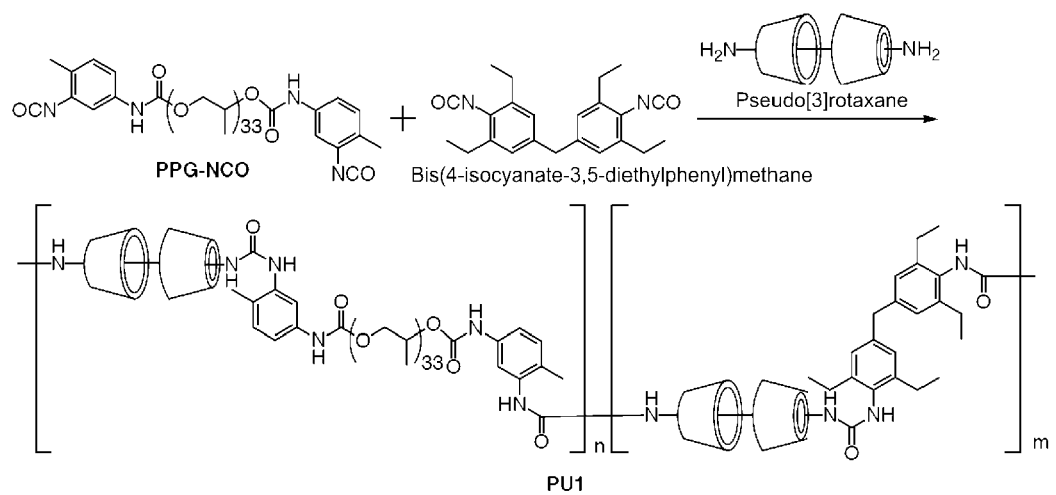
FIG. 9 is an illustrative figure showing one example of a reaction scheme producing a rotaxane polyurea according to the present invention.
FIG. 10 is an illustrative figure showing one example of a reaction scheme producing a rotaxane polyurea according to the present invention.

NCO-PPG (9.6 g, 4.2 mmol) and bis(4-isocyanate-3,5-diethylphenyl)methane (0.17 g, 0.47 mmol) were dissolved in DMF (60 ml) at 0° C. to obtain a solution, and the pseudo-[3] rotaxane diamine (10 g, 4.7 mmol) was added to the solution and the mixture was stirred for 24 hours at room temperature The resulting mixture was poured into water, and the precipitate was dried in vacuo at 80° C. to give a rotaxane polyurea PU1 as a white solid (10.5 g, yield: 53%). The reaction scheme of PU1 is shown in FIG. 9. The obtained rotaxane polyurea has a random structure. $^1$H NMR data of PU1 are shown as below.

$^1$H NMR (300 MHz, 298 K, DMF-$d_7$) δ8.32-7.90 (m, 1.2H), 7.85-6.49 (m, 5.8H), 5.10-4.81 (m, C(1)H, 3.4H), 3.84-3.15 (m, 113.5H), 2.58 (s, 0.80H), 2.24-2.05 (m, 5.4H), 1.52-0.86 (m, 110.3H) ppm.

(2) Production of PU2 (Prepolymer Method)

NCO-PPG (9.6 g, 4.2 mmol) was dissolved in DMF (60 ml) at 0° C. to obtain a solution, the pseudo-[3] rotaxane diamine (10 g, 4.7 mmol) was added to the solution and reacted for 1 hour, and then bis(4-isocyanate-3,5-diethylphenyl)methane (0.17 g, 0.47 mmol) was added and the mixture was stirred for 24 hours at room temperature. The resulting mixture was poured into water, and the precipitate was dried in vacuo at 80° C. to give a rotaxane polyurea PU2 as a white solid (10.9 g, yield: 55%). The obtained rotaxane polyurea has a random structure.

(3) Production of PU3 to PU7

Various rotaxane polyureas PU3 to PU7 were produced by the same method as that for producing PU2 except that bis(4-amino-3,5-diethylphenyl)methane was used as the blocking compound after adding the pseudo-[3] rotaxane diamine to the solution having NCO-PPG dissolved in DMF and stirring the mixture for 24 hours, and the amount of the raw material and the solvent to be used were changed according to Table 1. The reaction scheme of PU3 to PU7 is shown in FIG. 10.

(4) Production of PU8 to PU10

Figure 11:
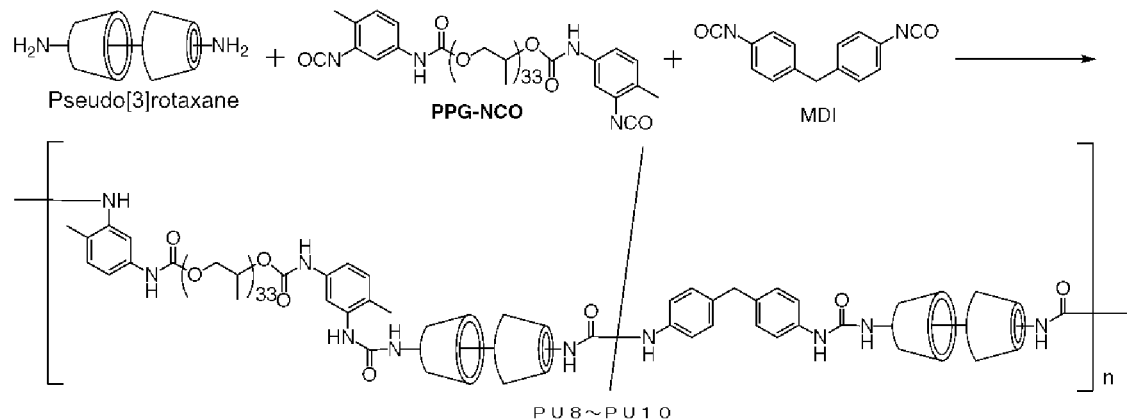
FIG. 11 is an illustrative figure showing one example of a reaction scheme producing a rotaxane polyurea according to the present invention.

Various rotaxane polyureas PU8 to PU10 were produced by the same method as that for producing PU1 except that no blocking compound was used, MDI was further used as the diisocyanate, and the amount of the raw material was changed according to Table 1. The reaction scheme of PU8 to PU10 is shown in FIG. 11.

(5) Production of PU11 to PU13

Figure 12:
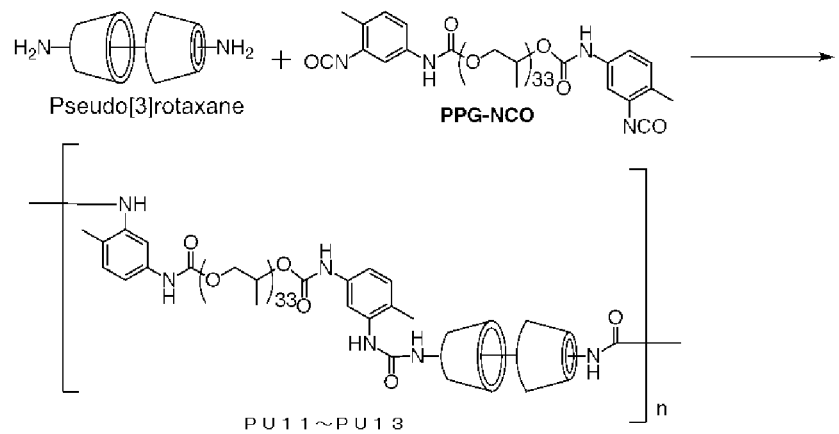
FIG. 12 is an illustrative figure showing one example of a reaction scheme producing a rotaxane polyurea according to the present invention.

Various rotaxane polyureas PU11 to PU13 were produced by the same method as that for producing PU1 except that no blocking compound was used, the equivalence ratio of the pseudo-[3] rotaxane diamine to NCO-PPG was changed to 1:1 from 1:0.9, and the reaction temperature was changed according to Table 2 and the reaction was conducted for another 24 hours after adding the pseudo-[3] rotaxane diamine to the solution having NCO-PPG dissolved in DMF and stirring the mixture for 24 hours at room temperature. The reaction scheme of PU11 to PU13 is shown in FIG. 12.

Regarding the above PU1 to PU13, the material and the amount thereof to be used, the production method, the solvent to be used, the reaction temperature, and the yield, Mn, Mw, PDI, coverage ratio of the product are summarized in Tables 1, and 2.

TABLE 1

| Rotaxane polyurea No. | | PU1 | PU2 | PU3 | PU4 | PU5 | PU6 | PU7 |
|---|---|---|---|---|---|---|---|---|
| Rotaxane diamine (molar ratio) | | 1.0 | 1.0 | 0.8 | 0.9 | 0.95 | 0.95 | 0.95 |
| Diisocyanate (molar ratio) | NCO-PPG | 0.9 | 0.9 | 1.0 | 1.0 | 1.0 | 1.0 | 1.0 |
| | MDI | — | — | — | — | — | — | — |
| Blocking compound (molar ratio) | Bis(4-isocyanate-3,5-diethylphenyl)methane | 0.1 | 0.1 | — | — | — | — | — |
| | (4-amino-3,5-diethylphenyl)methane | — | — | 0.2 | 0.1 | 0.05 | 0.05 | 0.05 |
| Production method* | | Method A | Method B | Method B | Method B | Method B | Method B | Method B |
| Solvent to be used | | DMF | DMF | DMF | DMF | DMF | DMAc | NMP |
| Reaction temperature (° C.) | | Room temperature | Room temperature | Room temperature | Room temperature | Room temperature | Room temperature | Room temperature |
| Yield (%) | | 53 | 55 | 60 | 58 | 55 | 54 | 55 |
| Number average molecular weight Mn (× $10^4$) | | 2.0 | 9.2 | 2.5 | 2.2 | 3.1 | 2.2 | 2.3 |
| Weight average molecular weight Mw (× $10^4$) | | 3.3 | 17 | 6.3 | 8.3 | 9.3 | 3.7 | 4.3 |
| Dispersity PDI (Mw/Mn) | | 1.7 | 1.9 | 2.5 | 3.8 | 3.0 | 1.7 | 2.4 |
| Coverage ratio (%) of cyclic molecule of diamine chain moiety | | 28 | — | 43 | 33 | 49 | 32 | 28 |
| Coverage ratio (%) of cyclic molecule of whole polyurea chain | | 3.0 | — | 4.6 | 3.6 | 5.3 | 3.9 | 3.0 |

*Temperature after the reaction liquid was stirred for 24 hours, Method A: one-shot method, Method B: prepolymer method

TABLE 2

| Rotaxane polyurea No. | | PU8 | PU9 | PU10 | PU1 | PU12 | PU13 |
|---|---|---|---|---|---|---|---|
| Rotaxane diamine (molar ratio) | | 1.0 | 1.0 | 1.0 | 1.0 | 1.0 | 1.0 |
| Diisocyanate (molar ratio) | NCO-PPG | 0.9 | 0.8 | 0.5 | 1.0 | 1.0 | 1.0 |
| | MDI | 0.1 | 0.2 | 0.5 | — | — | — |
| Blocking compound (molar ratio) | Bis(4-isocyanate-3,5-diethylphenyl)methane | — | — | — | — | — | — |
| | (4-amino-3,5-diethylphenyl)methane | | | | | | |
| Production method* | | Method A | Method A | Method A | Method A | Method A | Method A |
| Solvent to be used | | DMF | DMF | DMF | DMF | DMF | DMF |
| Reaction temperature (° C.) | | Room temperature | Room temperature | Room temperature | 25* | 50* | 100* |
| Yield (%) | | 59 | 51 | 41 | 59 | 67 | 63 |
| Number average molecular weight Mn ($\times 10^4$) | | 1.6 | 1.3 | 0.26 | 2.8 | 2.3 | 2.3 |
| Weight average molecular weight Mw ($\times 10^4$) | | 2.8 | 2.2 | 1.2 | 6.9 | 6.6 | 4.8 |
| Dispersity PDI (Mw/Mn) | | 1.8 | 1.7 | 4.6 | 2.5 | 2.9 | 2.1 |
| Coverage ratio (%) of cyclic molecule on diamine chain moiety | | 50 | 33 | 22 | — | — | — |
| Coverage ratio (%) of cyclic molecule on whole polyurea chain | | 5.4 | 3.6 | 2.4 | — | — | — |

*Temperature after the reaction liquid was stirred for 24 hours, Method A: one-shot method, Method B: prepolymer method In addition, among the above PU1 to PU13, PU2 to PU5 were used to measure tensile properties (Young's modulus, strain at break, and stress at break). The measurement results are summarized in Table 3.

TABLE 3

| Rotaxane polyurea No. | PU2 | PU3 | PU4 | PU5 |
|---|---|---|---|---|
| Young's modulus (MPa) | 27 | 7.1 | 5.6 | 7.1 |
| Strain at break (%) | 370 | 59 | 380 | 560 |
| Stress at break (MPa) | 2.7 | 1.8 | 2.3 | 4.6 |
| Fracture energy (MJ/m³) | 8.5 | 0.83 | 6.9 | 17 |

Production of Crosslinked Product of Rotaxane Polyurea (PU14)

NCO-PPG (10.8 g, 4.7 mmol) was dissolved in DMF (60 ml) at 0° C. to obtain a solution, the pseudo-[3] rotaxane diamine (9.7 g, 4.5 mmol) was added to the solution and the mixture was stirred for 24 hours at room temperature, and then bis(4-amino-3,5-diethylphenyl)methane (73 mg, 0.24 mmol) was added and the mixture was stirred for additional 24 hours. MDI (77 mg, 0.31 mmol) as the crosslinking agent, and dibutyltin dilaurate (19 mg, 0.032 mmol) were added to the obtained mixture (containing rotaxane polyurea product, solvent, and the like), and stirred for additional 24 hours. The resulting mixture was poured into water, and the precipitate was dried in vacuo at 80° C. to give a crosslinked product No. 1 (PU14) of rotaxane polyurea as a white solid (12 g, yield: 59%). $^1$H-NMR data of the crosslinked product No. 1 (PU14) of rotaxane polyurea are shown as below (refer to FIG. 15).

$^1$H NMR (300 MHz, 298 K, DMF-d$_6$) δ9.64-6.41 (m, 14.9H), 5.70-5.46 (m, 2.7H), 5.04-4.81 (m, C(1)H, 3.4H), 4.64-4.57 (m, 1.1H), 3.96-2.84 (m, 123.4H), 2.33-1.92 (m, 6.4H), 1.68-0.68 (m, 118.6H) ppm.

It is noted that the rotaxane polyurea was produced separately by the same method as that described above, the resulting mixture (containing rotaxane polyurea product, solvent, and the like) was poured into water, and the precipitate was dried in vacuo at 80° C. to give a rotaxane polyurea purified product as a white solid. It was confirmed that the obtained rotaxane polyurea purified product has a number average molecular weight Mn of 31000, a weight average molecular weight Mw of 93000, a molecular weight distribution of 3.0, the coverage ratio by the cyclodextrin of 49% for the diamine chain, and the coverage ratio by the cyclodextrin of 5.3% for the polyurea chain.

Further, the crosslinked products No. 2 and No. 3 of the rotaxane polyurea were produced by the same method as that for producing the crosslinked product No. 1 of the rotaxane polyurea except that the amounts of MDI and dibutyltin dilaurate were changed according to Table 4.

Figure 13:
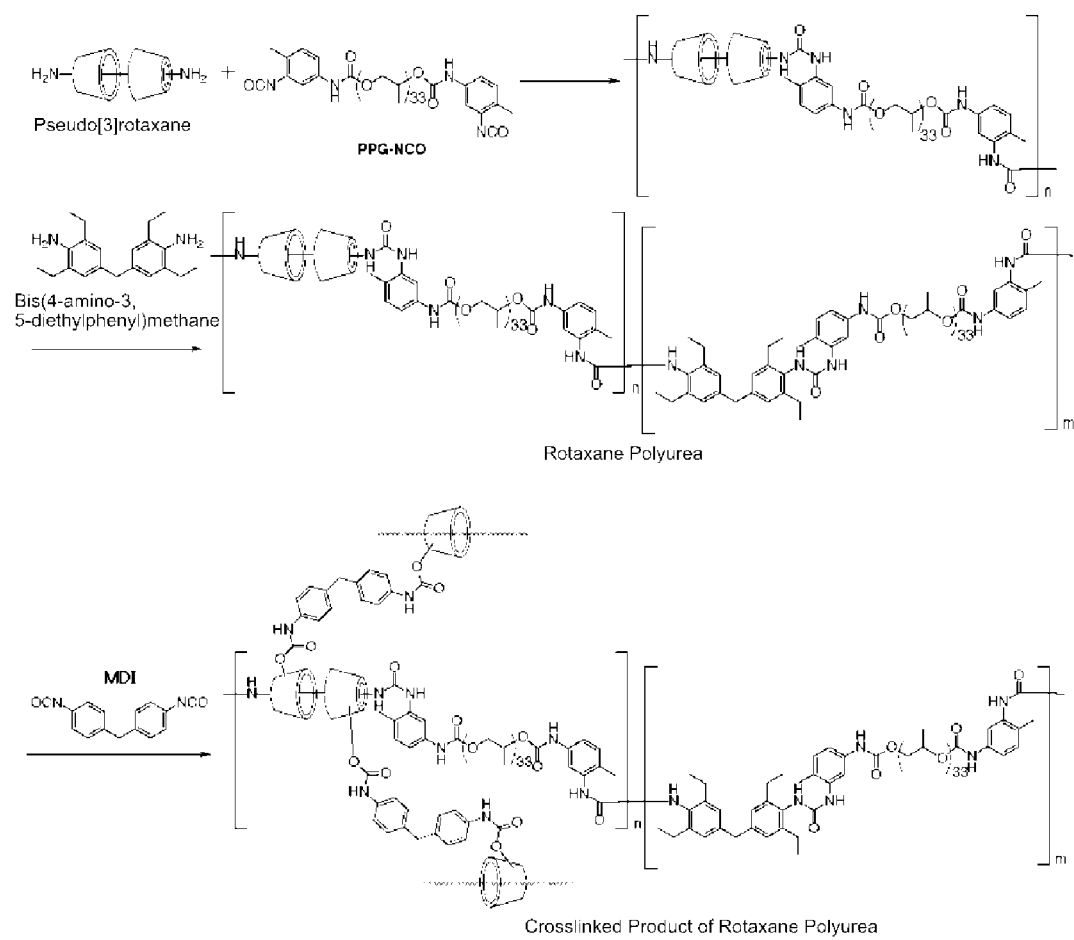
FIG. 13 is an illustrative figure showing one example of a reaction scheme producing a crosslinked product of a rotaxane polyurea according to the present invention.

The reaction scheme of the production of the crosslinked product of the rotaxane polyurea was shown in FIG. 13.

Regarding the crosslinked products No. 1 to No. 3 of the rotaxane polyurea, the amount of MDI and dibutyltin dilaurate, the yield of the product, the coverage ratio of the cyclodextrin, and measurement results of various tensile properties (Young's modulus, fracture strain, fracture stress, fracture energy) are shown in Table 4.

TABLE 4

| Crosslinked product No. of rotaxane polyurea | 1 | 2 | 3 |
|---|---|---|---|
| MDI (mole %)* | 3.5 | 7.0 | 14 |
| DBTDL (mole %)* | 0.35 | 0.70 | 1.4 |
| Yield (%) | 59 | 70 | 61 |
| Coverage ratio of cyclodextrin on diamine chain moiety (%) | 30 | — | — |
| Coverage ratio of cyclodextrin on whole polyurea chain (%) | 3.2 | — | — |
| Young's modulus (MPa) | 12 | 13 | 0 |
| Strain at break (%) | 190 | 9.6 | Sample was too fragile to be measured |
| Stress at break (MPa) | 1.5 | 0.9 | Sample was too fragile to be measured |
| Fracture energy (MJ/m³) | 0.073 | 2.2 | Sample was too fragile to be measured |

*mole % relative to cyclodextrin

The rotaxane polyurea according to the present invention is useful as a novel material.

The crosslinked product of a rotaxane polyurea according to the present invention is useful as a novel material.

The present invention includes the following embodiments.

Embodiment 1

A crosslinked product of a rotaxane polyurea, wherein the rotaxane polyurea has at least one cyclodextrin and a polyurea chain piercing through the cyclodextrin, and the cyclodextrins in the rotaxane polyurea are crosslinked with a crosslinking agent.

Embodiment 2

The crosslinked product of the rotaxane polyurea according to Embodiment 1, wherein the crosslinking agent is a polyisocyanate, and reacts with hydroxy groups of the cyclodextrin to crosslink the rotaxane polyurea.

Embodiment 3

The crosslinked product of the rotaxane polyurea according to Embodiment 1, wherein the polyurea chain has a urea bond formed in the molecular chain thereof by a reaction between a diisocyanate and a rotaxane diamine that has at least one cyclodextrin and a diamine piercing through the cyclodextrin.

Embodiment 4

The crosslinked product of the rotaxane polyurea according to Embodiment 3, wherein the diisocyanate includes a diisocyanate monomer or a diisocyanate macromonomer.

Embodiment 5

The crosslinked product of the rotaxane polyurea according to Embodiment 3, wherein the rotaxane diamine has two cyclodextrins and a diamine piercing through the two cyclodextrins.

Embodiment 6

The crosslinked product of the rotaxane polyurea according to Embodiment 3, wherein the rotaxane diamine has no blocking group preventing elimination of the cyclodextrin from the diamine.

Embodiment 7

The crosslinked product of the rotaxane polyurea according to Embodiment 3, wherein the diamine in the rotaxane diamine is a linear alkane diamine having 6 to 20 carbon atoms.

Embodiment 8

The crosslinked product of the rotaxane polyurea according to Embodiment 7, wherein the diamine in the rotaxane diamine is dodecane diamine.

Embodiment 9

The crosslinked product of the rotaxane polyurea according to Embodiment 1, wherein the polyurea chain has a blocking structure preventing elimination of the cyclodextrin from the polyurea chain in main chain or at the terminal of the main chain.

Embodiment 10

The crosslinked product of the rotaxane polyurea according to Embodiment 9, wherein the blocking structure in the main chain is formed from a blocking compound that has two functional groups reactive with the rotaxane diamine or diisocyanate and blocks the cyclodextrin by steric hindrance.

Embodiment 11

The crosslinked product of the rotaxane polyurea according to Embodiment 10, wherein the blocking compound is at least one member selected from the group consisting of a diamine, a diisocyanate, and a diol.

Embodiment 12

The crosslinked product of the rotaxane polyurea according to Embodiment 9, wherein the blocking structure at the terminal of the main chain is formed from a blocking compound that has one functional group reactive with the rotaxane diamine or diisocyanate and blocks the cyclodextrin by steric hindrance.

Embodiment 13

The crosslinked product of the rotaxane polyurea according to Embodiment 12, wherein the blocking compound is at least one member selected from the group consisting of a monoamine, a monoisocyanate, and a monoalcohol.

Embodiment 14

The crosslinked product of the rotaxane polyurea according to Embodiment 1, wherein the cyclodextrin is at least one member selected from the group consisting of α-cyclodextrin, β-cyclodextrin, and γ-cyclodextrin.

Embodiment 15

A crosslinked product of a rotaxane polyurea.urethane, wherein the polyurea chain in the rotaxane polyurea according to Embodiment 1 is a polyurea.urethane chain further having a urethane bond in the molecular chain of the polyurea.chain.

Embodiment 16

A production method of a crosslinked product of a rotaxane polyurea, comprising a step of reacting a rotaxane diamine that has the cyclodextrin and a diamine piercing through the cyclodextrin with a diisocyanate capable of piercing through the cyclodextrin to produce a rotaxane polyurea having at least one cyclodextrin and a polyurea chain piercing through the cyclodextrin; and a step of crosslinking the cyclodextrins in the rotaxane polyurea with a crosslinking agent.

Embodiment 17

A production method of a crosslinked product of a rotaxane polyurea, comprising a step of undergoing a reaction of a rotaxane diamine that has the cyclodextrin and a diamine piercing through the cyclodextrin, a diisocyanate capable of piercing through the cyclodextrin, and a blocking compound having two functional groups reactive with the rotaxane diamine or diisocyanate and blocks the cyclodextrin by steric hindrance to produce a rotaxane polyurea having a polyurea chain piercing through a cyclodextrin; and a step of crosslinking the cyclodextrins in the rotaxane polyurea with a crosslinking agent.

Embodiment 18

The production method of the crosslinked product of the rotaxane polyurea according to Embodiment 16 or 17, wherein the diisocyanate includes a diisocyanate macromonomer.

Embodiment 19

The production method of the crosslinked product of the rotaxane polyurea according to Embodiment 18, wherein the diisocyanate macromonomer includes a product obtained by a reaction between a diisocyanate monomer and a polyether diol.

Embodiment 20

The production method of the crosslinked product of the rotaxane polyurea according to Embodiment 17, wherein the blocking compounds includes at least one compound selected from the group consisting of a diamine, a diisocyanate, and a diol.

Embodiment 21

The production method of the crosslinked product of the rotaxane polyurea according to any one of Embodiments 16 to 20, wherein the crosslinking agent includes a polyisocyanate, and the crosslinking agent reacts with hydroxy groups in the cyclodextrin to crosslink the rotaxane polyurea.

This application is based on Japanese Patent applications No. 2019-236370 and No. 2019-236371 filed on Dec. 26, 2019, the contents of which are hereby incorporated by reference.

The invention claimed is:

1. A rotaxane polyurea having at least one cyclic molecule and a polyurea chain piercing through the cyclic molecule, wherein the polyurea chain has a urea bond formed in the molecular chain thereof by a reaction between a diisocyanate macromonomer and a rotaxane diamine that has at least one cyclic molecule and a diamine piercing through the cyclic molecule.

2. The rotaxane polyurea according to claim 1, wherein the rotaxane diamine has two cyclic molecules and the diamine piercing through the two cyclic molecules.

3. The rotaxane polyurea according to claim 1, wherein the rotaxane diamine has no blocking group preventing elimination of the cyclic molecule from the diamine.

4. The rotaxane polyurea according to claim 1, wherein the diamine included in the rotaxane diamine is a linear alkane diamine having 6 to 20 carbon atoms.

5. The rotaxane polyurea according to claim 4, wherein the diamine included in the rotaxane diamine is dodecane diamine.

6. The rotaxane polyurea according to claim 1, wherein the polyurea chain has a blocking structure preventing elimination of the cyclic molecule from the polyurea chain in the main chain or at a terminal of the main chain.

7. The rotaxane polyurea according to claim 6, wherein the blocking structure in the main chain is formed from a blocking compound that has two functional groups reactive with the rotaxane diamine or diisocyanate and blocks the cyclic molecule by steric hindrance.

8. The rotaxane polyurea according to claim 7, wherein the blocking compound is at least one member selected from the group consisting of a diamine, a diisocyanate, and a diol.

9. The rotaxane polyurea according to claim 6, wherein the blocking structure at the terminal of the main chain is formed from a blocking compound that has one functional group reactive with the rotaxane diamine or diisocyanate and blocks the cyclic molecule by steric hindrance.

10. The rotaxane polyurea according to claim 9, wherein the blocking compound is at least one member selected from the group consisting of a monoamine, a monoisocyanate, and a monoalcohol.

11. The rotaxane polyurea according to claim 1, wherein the cyclic molecule is at least one member selected from the group consisting of α-cyclodextrin, β-cyclodextrin, and γ-cyclodextrin.

12. A rotaxane polyurea-urethane further having a urethane bond in the molecular chain of the polyurea chain included in the rotaxane polyurea according to claim 1.

13. A method for producing a rotaxane polyurea, comprising carrying out a reaction between a rotaxane diamine that has a cyclic molecule and a diamine piercing through the cyclic molecule, and a diisocyanate capable of piercing through the cyclic molecule, wherein the diisocyanate includes a diisocyanate macromonomer.

14. The method for producing the rotaxane polyurea according to claim 13, wherein the diisocyanate macromonomer includes a reaction product between a diisocyanate monomer and a polyether diol.

15. A method for producing a rotaxane polyurea, comprising carrying out a reaction of a rotaxane diamine that has a cyclic molecule and a diamine piercing through the cyclic molecule, a diisocyanate capable of piercing through the cyclic molecule, and a blocking compound that has two functional groups reactive with the rotaxane diamine or diisocyanate and blocks the cyclic molecule by steric hindrance, to form a polyurea chain piercing through the cyclic molecule, wherein the diisocyanate includes a diisocyanate macromonomer.

16. The method for producing the rotaxane polyurea according to claim 15, wherein the diisocyanate macromonomer includes a reaction product between a diisocyanate monomer and a polyether diol.

17. The method for producing the rotaxane polyurea according to claim 15, wherein the blocking compound includes at least one member selected from the group consisting of a diamine, a diisocyanate, and a diol.

* * * * *